United States Patent [19]
Gunell

[11] Patent Number: 5,495,524
[45] Date of Patent: Feb. 27, 1996

[54] TELEPHONE CROSS CONNECT PANEL

[75] Inventor: Gary J. Gunell, Woodinville, Wash.

[73] Assignee: Augat Inc., Mansfield, Mass.

[21] Appl. No.: 373,901

[22] Filed: Jan. 17, 1995

[51] Int. Cl.⁶ .................................................. H04M 5/02
[52] U.S. Cl. ........................... 379/327; 379/399; 379/397
[58] Field of Search ..................................... 379/329, 327, 379/331, 399, 330, 397; 361/724

[56] References Cited

U.S. PATENT DOCUMENTS

| | | | |
|---|---|---|---|
| 4,536,052 | 8/1985 | Baker et al. | 379/329 |
| 4,595,799 | 6/1986 | Krob et al. | 379/397 |
| 4,605,275 | 8/1986 | Pavel | 379/329 |
| 4,675,900 | 6/1987 | Temkin | 379/327 |
| 4,823,381 | 4/1989 | Olson | 379/327 |
| 4,835,659 | 5/1989 | Goodson | 379/327 |
| 4,932,051 | 6/1990 | Karan et al. | 379/327 |
| 5,208,737 | 5/1993 | Miller | 379/327 |
| 5,220,600 | 6/1993 | Chouanard et al. | 379/327 |
| 5,265,156 | 11/1993 | Eason et al. | 379/327 |

*Primary Examiner*—Jeffery Hofsass
*Assistant Examiner*—Scott Wolinsky
*Attorney, Agent, or Firm*—Weingarten, Schurgin, Gagnebin & Hayes

[57] ABSTRACT

The invention provides a cross connect panel in which the cross connect field has mounted thereover a cover member which covers the field of cross connect pins and wires attached thereto, the cover member being pivotably mounted and movable to an open position to expose the cross connect terminal pin field and serve as a jumper tray for retaining the cross connect jumpers while providing full access to the exposed set of terminal pins within the cross connect field. The cover member may be readily detached if desired for removal from the panel. The panel also includes one or more cable guide rings which are adjustably mounted to the panel to accommodate different intended installation requirements, and a moveable tray which can include a circuit directory.

9 Claims, 8 Drawing Sheets

TELEPHONE CROSS CONNECT PANEL

FIELD OF THE INVENTION

This invention relates to telephone cross connect panels.

BACKGROUND OF THE INVENTION

In telephone cross connect panels employed for the monitoring and re-routing of telephone circuits, wire and cable management is important for orderly installation, maintenance and replacement of panel wiring. A typical cross connect field for a DSX-1 type panel contains five terminal pins per circuit. A typical in/out terminal field for such a panel contains four terminal pins per circuit. Typically, 56 circuits are provided in a standard 23 inch rack, with higher density panels employing up to 84 circuits per panel. Thus, the number of cross connect terminal pins can total 280 to 420, and the number of in/out terminal pins can total 224 to 336 per panel.

The in/out terminal pins are typically wired to the equipment terminal pins in groups of 28 circuits at a time (four terminal pins per circuit). As any installed cross connect jumpers would be in the way and prevent installation of equipment terminations in the in/out terminal pin field, in a typical panel, all in/out terminals of the 56 to 84 circuits of the panel must be wired to the equipment terminal pins prior to the start of termination of the cross connect jumpers.

Other difficulties which arise in cross connect panels of higher densities include cable/wire management after the terminal fields have been wired and the lack of space on the panels for labeling the circuits.

SUMMARY OF THE INVENTION

The invention provides a cross connect panel in which the cross connect field has mounted thereover a cover member which covers the field of cross connect pins and wires attached thereto, the cover member being pivotably mounted and movable to an open position to expose the terminal pin field and serve as a jumper tray for retaining the cross connect jumpers while providing full access to the exposed set of terminal pins within the cross connect field. The pivotable jumper tray of the present invention allows equipment terminations in the in/out terminal field to be easily added even after cross connect terminations have been made. The pivot action of the tray lifts the cross connect jumpers in the tray up and away from the in/out terminal field. The cover member may be readily detached if desired for removal from the panel. The panel also includes one or more cable guide rings which are adjustably mounted to the panel to accommodate different intended installation requirements.

The front of the panel includes a directory which is provided on a pull-out tray or drawer preferably disposed below the array of jacks in the panel. The directory can be manually unlatched and pulled out and pivoted downward for visual access to the circuit labeling information marked on the directory. The directory is of a size to provide sufficient space for circuit labeling, which space is not available in a high density panel by reason of the number of circuits across the panel and the jack height requirement for a staggered array of adjacent jacks, which allows the use of double bantam jack plug termination on adjacent jacks.

BRIEF DESCRIPTION OF THE DRAWINGS

The present invention will be more fully understood by reference to the following detailed description considered in conjunction with the accompanying drawings, in which.

DETAILED DESCRIPTION OF THE INVENTION

Figure 1:
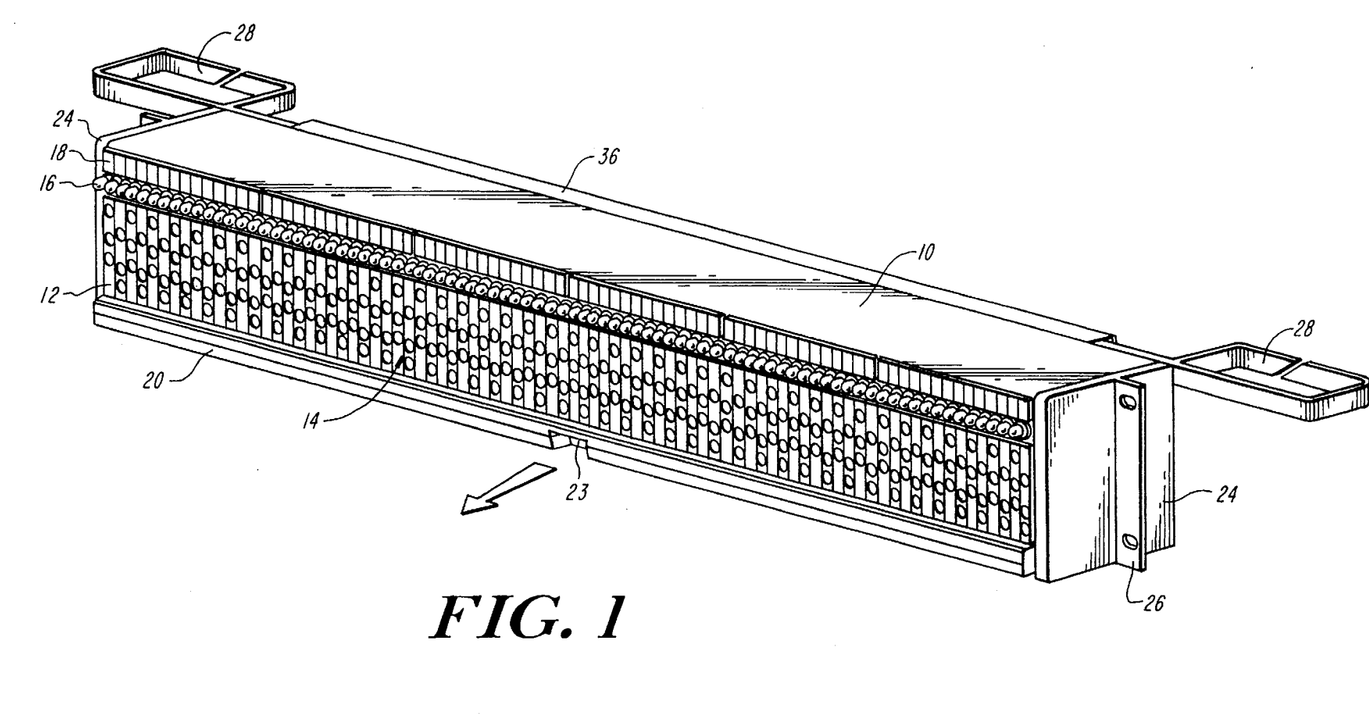
FIG. 1 is a perspective view of a telephone cross connect panel of the present invention.
Figure 2:
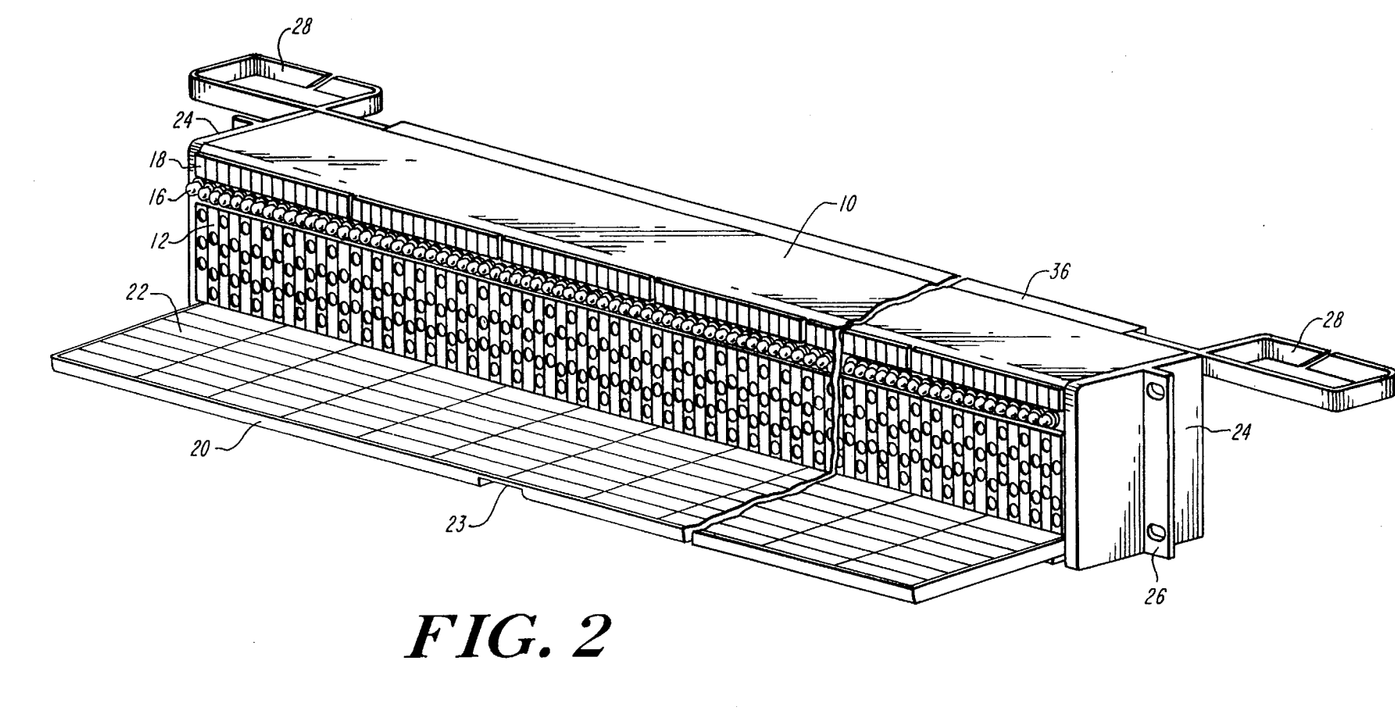
FIG. 2 is a front perspective view of a telephone cross connect panel of the present invention showing operation of the circuit directory tray or drawer.

Referring to the drawings when like reference numerals designate corresponding or similar elements throughout the several views, a telephone cross connect panel according to the present invention is shown. The telephone cross connect panel includes a housing 10 having an enclosure for receiving a plurality of modular jacks 12 and for retaining such jacks in a generally coplanar relation to the front 14 of the housing. As can be seen in FIGS. 1 and 2, in the preferred embodiment, the modular jacks are staggered to allow standard bantam single and dual patch cords and looping plugs (not shown) to be used in adjacent circuits.

To the front 14 of housing 10, an array of indicator lights or tracer lamps 16 are mounted over the modular jacks 12. In the embodiment shown, each light 16 corresponds to a respective modular jack 12 over which the light is positioned. When the appropriate pins on the cross connect terminal field are wired between two different circuits, the lamps associated with both circuits will light when a bantam jack plug is inserted in the monitor port of either one of the two cross connected circuits. In the preferred embodiment, lights 16 comprise flashing LED's in red, orange, green and/or yellow colors. Above the lights 16, labels 18 are provided on the front 14 of the housing to identify the circuits which correspond to the lights 16 and respective jacks 14.

Under the array of modular jacks 12, a tray or drawer 20 is provided which includes a directory of the circuits corresponding to the jacks 12. As can best be seen in FIGS. 1 and 2, in the preferred embodiment, tray or drawer 20 slides outward from the face 14 of the housing 10 to reveal a circuit directory 22 or other information on the top surface of the tray or drawer. The pull-out tray or drawer 20 is dimensioned to provide sufficient room for a circuit directory large enough to allow for proper labelling of the circuits. When the directory is not in use, tray or drawer 20 can be safely stored in the housing 10 of the panel. The tray or drawer 20 further includes a drawer pull 23 for grasping the tray in the closed position to slide it outward. In the embodiment shown in the drawings, drawer pull 23 is a recessed cutout having an indentation that can be engaged with one or two fingers.

Although a single pull-out tray or drawer 20, which is located under array of jacks 12, is shown in the drawings, other embodiments are possible. For example, the tray or drawer 20 can be located at other positions on the panel, or can include multiple trays or drawers located side by side, vertically stacked, or in other configurations.

Figure 3:
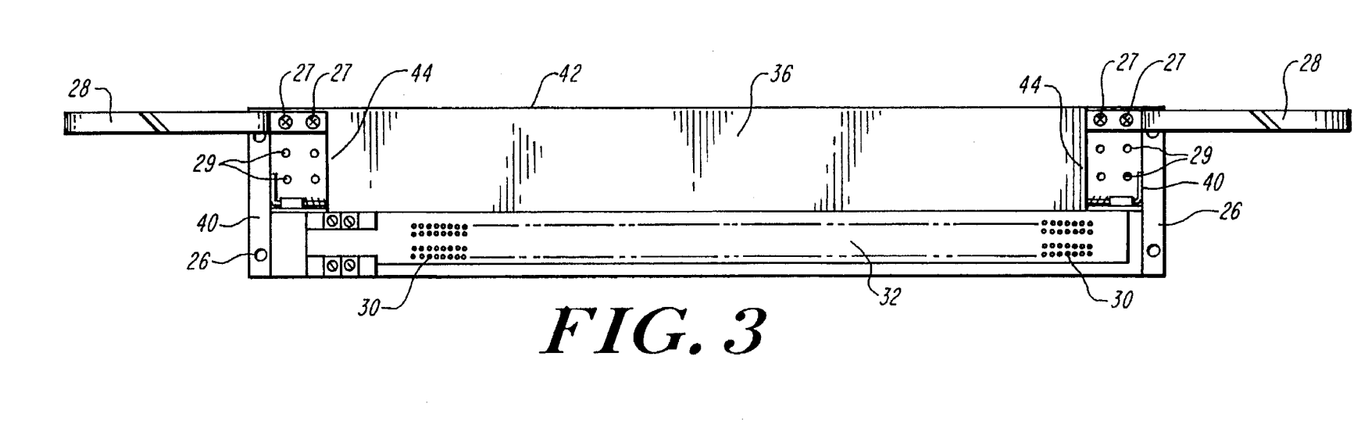
FIG. 3 is a back plan view of a telephone cross connect panel of the present invention.
Figure 4:
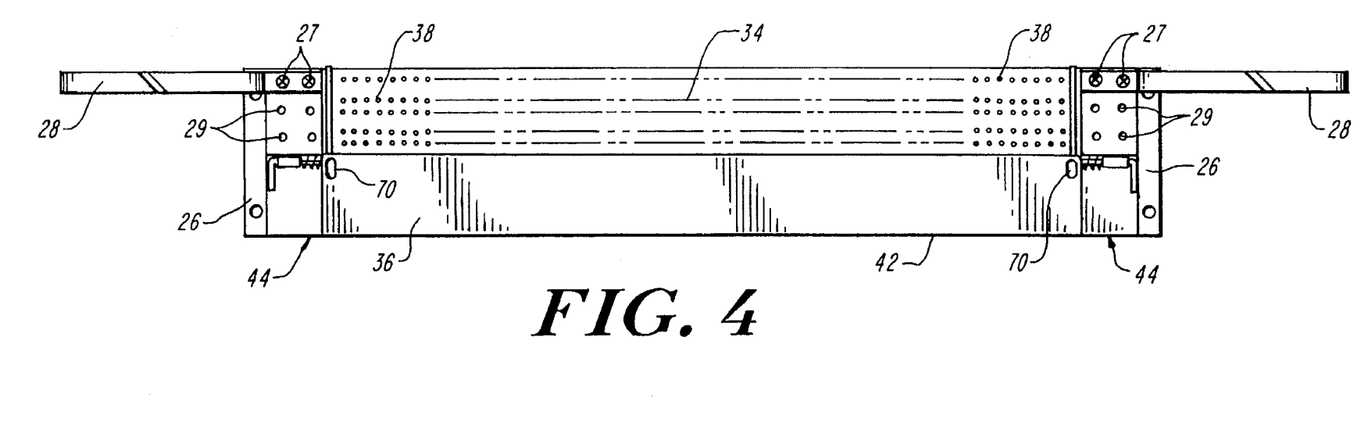
FIG. 4 is a back plan view of the telephone cross connect panel of FIG. 3 showing the jumper tray/cover in the open position.
Figure 5:
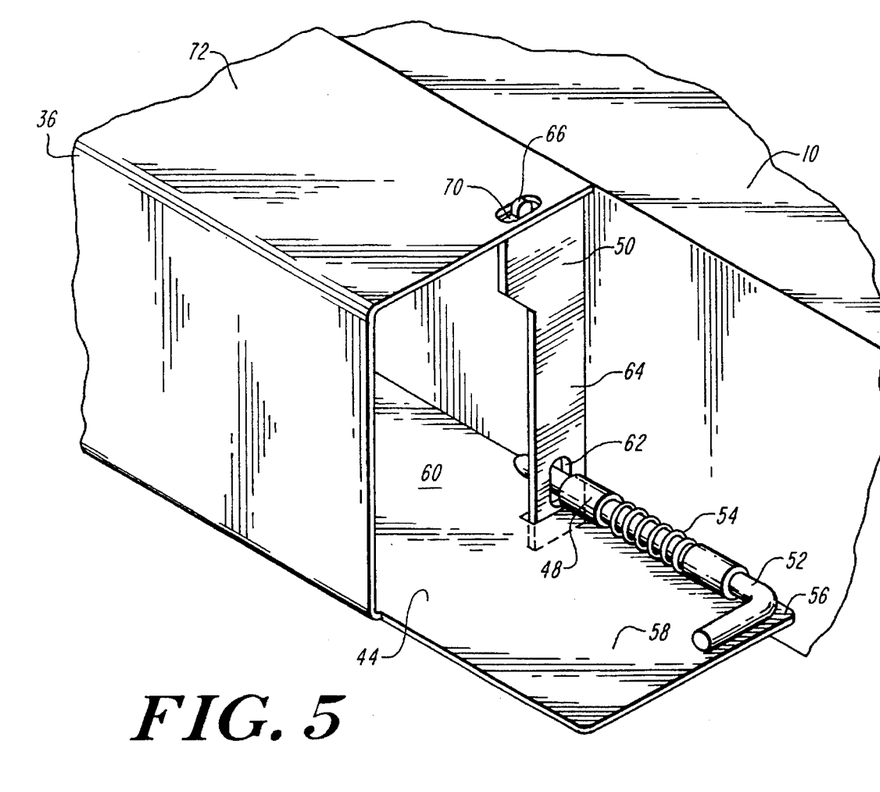
FIG. 5 is a detailed perspective view of the telephone cross connect panel of the previous figures showing the jumper tray/cover fastening assembly.

Housing 10 further includes, on sides 24, a bracket 26 for mounting the panel to an equipment rack or other structural fixture. Housing 10 can also include at least one cable ring 28 to organize and retain cabling associated with the panel. As can best be seen in FIG. 3, in the embodiment shown, a pair of cable rings 28 are affixed to the back of housing 10 with screws or other removable fasteners 27. In the preferred embodiment, cable rings 28 can each be positioned at one of multiple locations 29 on the back of housing 10.

Referring now to FIGS. 3 through 10, the cross connect panel of the present invention further includes an array of in/out terminals 30 positioned along a lower back portion 32 of housing 10. In the preferred embodiment, the in/out terminals 30 are positioned in a horizontal array along the bottom back half of the housing 10 in an undercut or recessed portion of the housing.

The cross connect panel also includes an array of cross connect terminals 38 positioned along an upper back portion 34 of housing 10. Over the array of cross connect terminals 38, a jumper cover/tray 36 is provided. In the preferred embodiment, the jumper cover/tray 36 is pivotably affixed to the back of housing 10 along an axis between the array of the cross connect terminals 38 and the array of in/out connectors 30 above the undercut or recessed portion of the housing. Thus, in the preferred embodiment, jumper cover/tray 36 pivots along a horizontal axis between the two arrays of terminals. This configuration allows the cover 36 to be moved without interfering with any wiring attached to the in/out terminals 30 or to the cross connect terminals 38.

In the preferred embodiment, jumper cover/tray 30 comprises a generally U or C shaped longitudinal channel section 42. At the ends 44 of the channel section 42, a fastening assembly 46 is provided for realeasably and pivotably fastening the cover to the housing 10. In the preferred embodiment, the fastening assembly 46 includes a spring-loaded pin assembly 48 and a top latch mechanism 50. The spring-loaded pin assembly 48 is affixed to the forward edge 56 of an extension 58 to the lower channel side 60 of cover 36 and includes a pin 52 biased to an inward position by spring 54. The pin 52 mates with an elongated hole 62 in a cover mounting bracket 64 vertically affixed to the back of housing 10.

The top latch mechanism 50, in the preferred embodiment, includes a tab 66 located on the top edge 68 of cover mounting bracket 64 and a corresponding hole or detent 70 in the edge of upper channel side 72.

Figure 6:
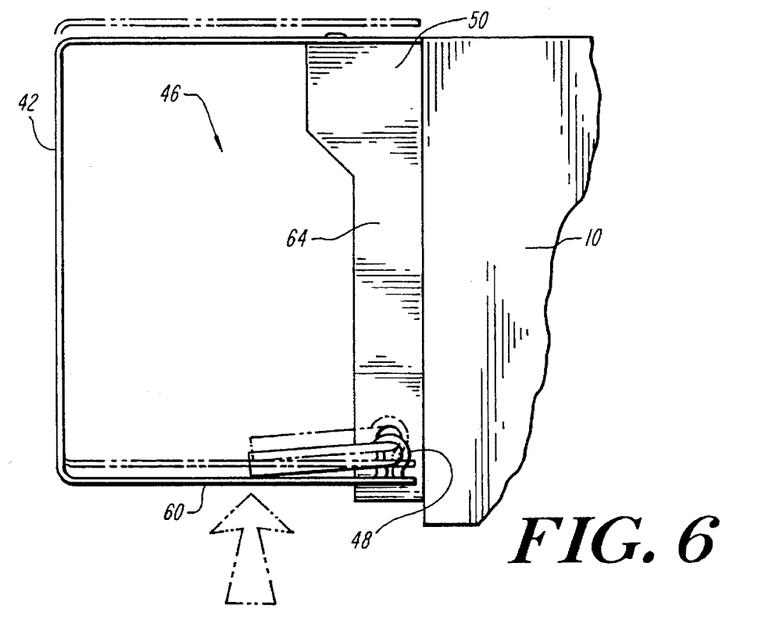
FIG. 6 is a detailed cross-section side view of the telephone cross connect panel of the previous figures showing operation of the jumper tray/cover.
Figure 7:
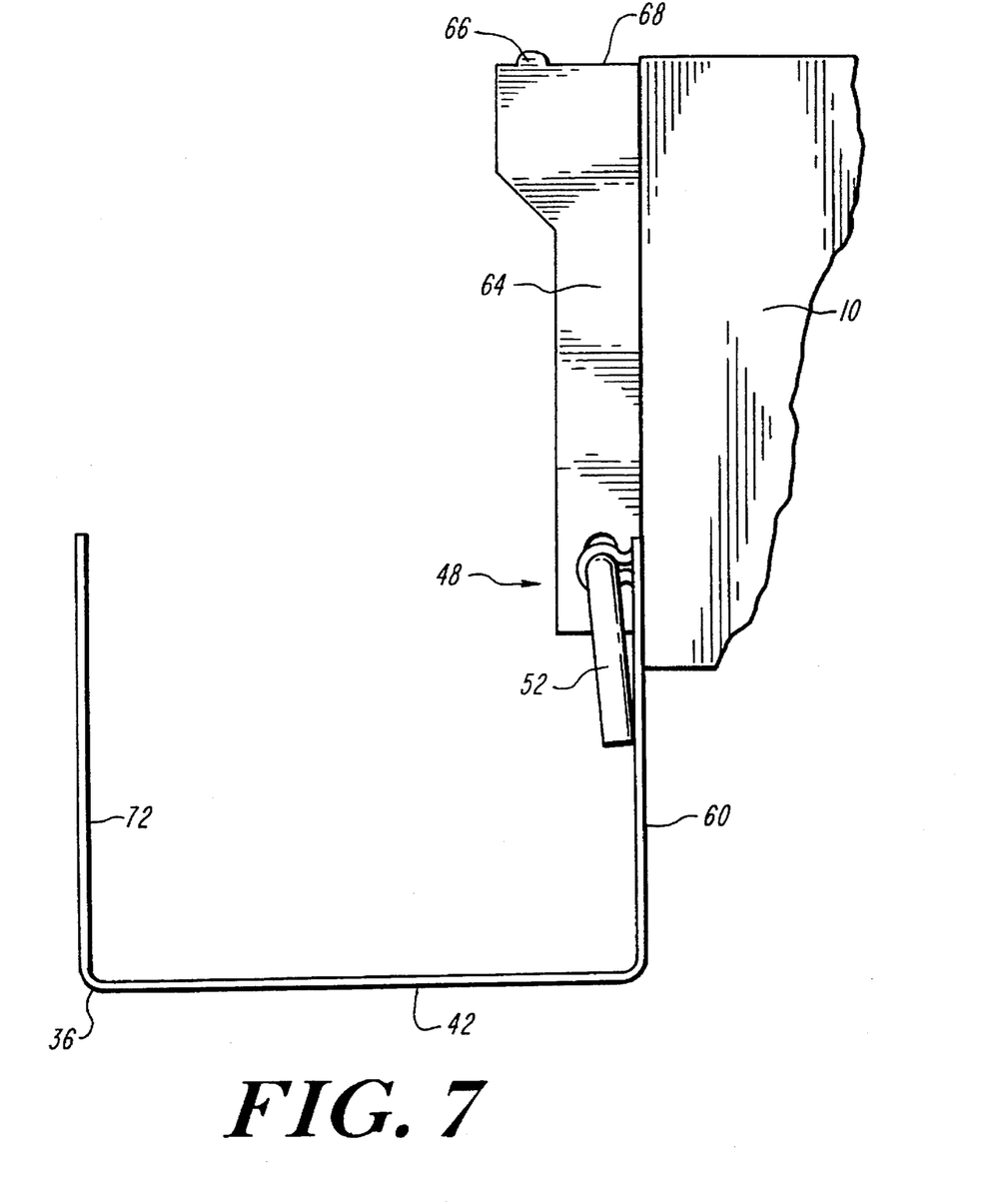
FIG. 7 is a detailed cross-section side view of the telephone cross connect panel of the previous figures showing the jumper tray/cover in an open position.
Figure 8:
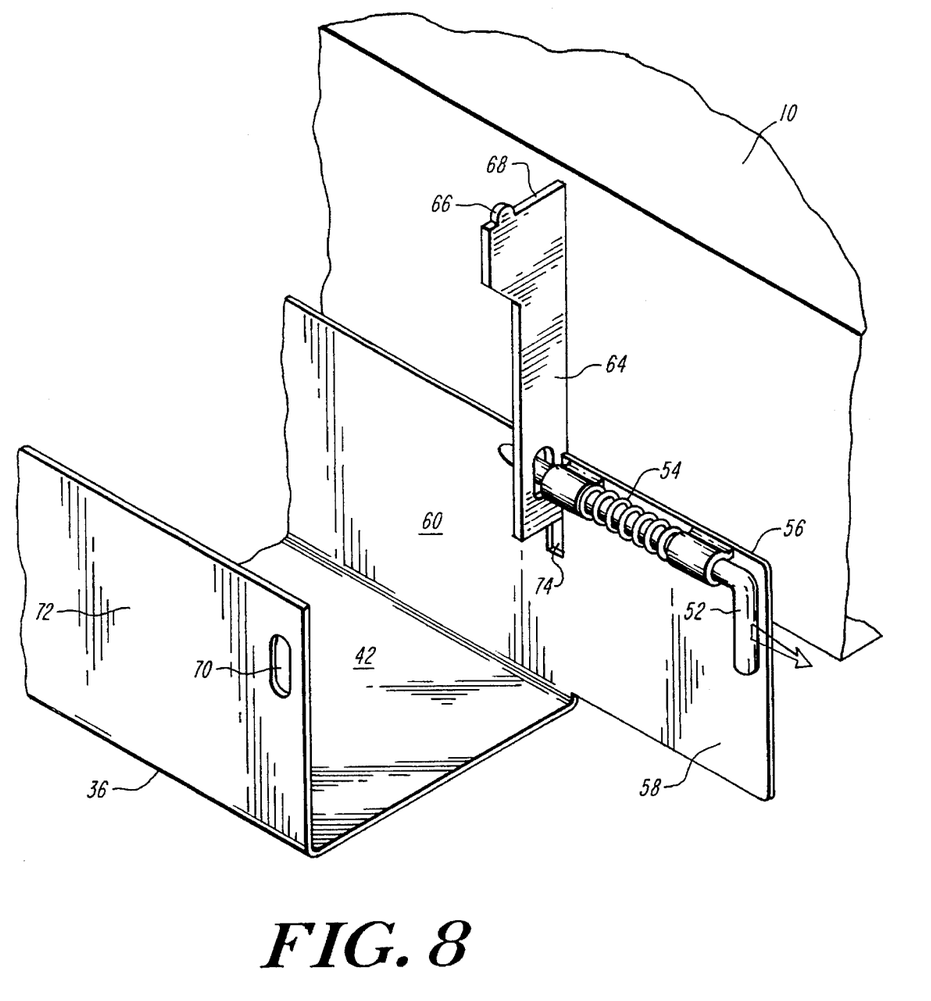
FIG. 8 is a detailed perspective view of the telephone cross-connect panel of the previous figures showing operation of the spring-loaded pin assembly.

As can best be seen in FIGS. 5 through 9, jumper tray/cover 36 can be quickly and easily released and lowered by pushing upwards on the tray/cover 36 in the direction of the arrow shown in FIG. 6. Upward movement of the tray/cover releases hole or detent 70 from tab 66, allowing the tray/cover to be pivoted downward along the axis of pin 52 to an open position, as shown in FIG. 7. As can be seen in FIG. 8, a cutout 74 is provided in lower channel side 60 to allow for the cover mounting bracket 64.

Figure 9:
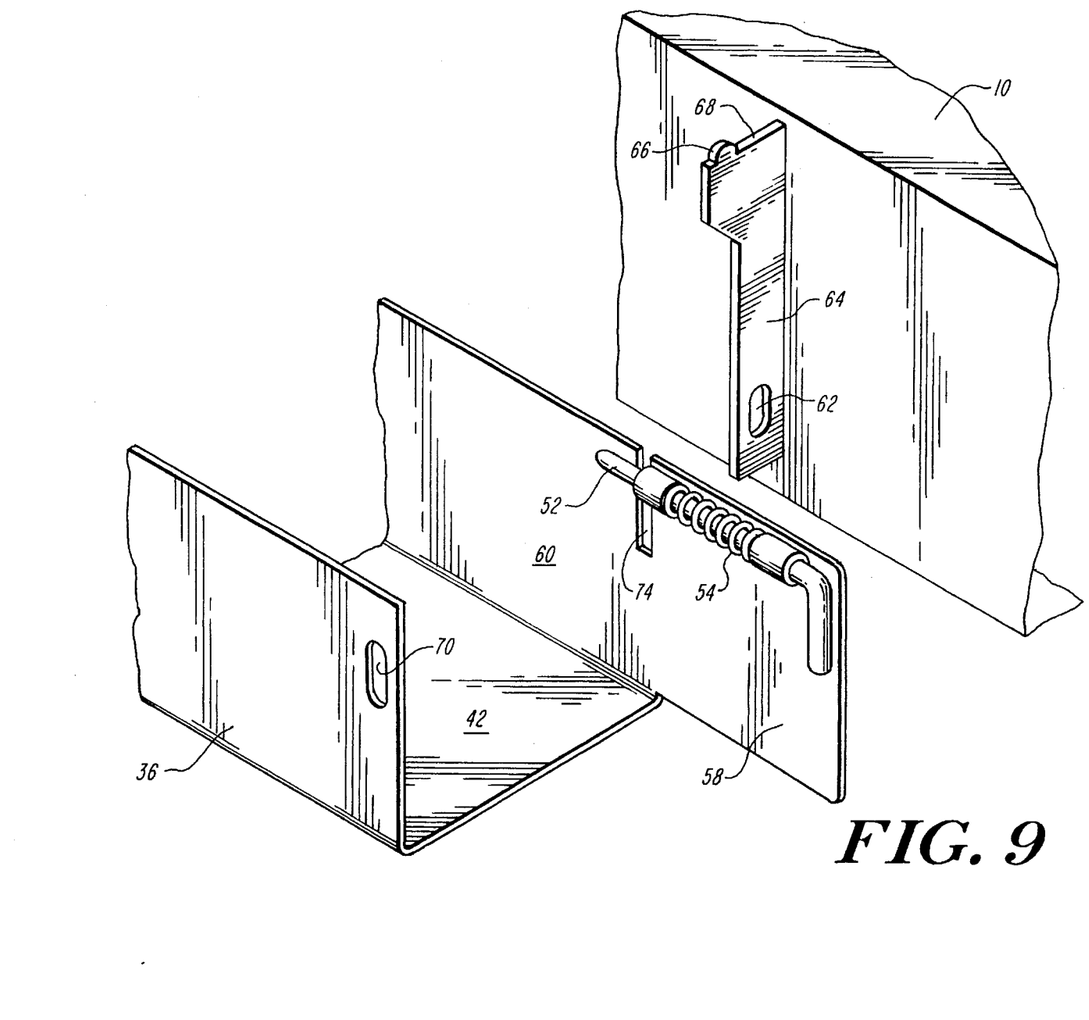
FIG. 9 is a detailed perspective view of the telephone cross-connect panel of the previous figures showing the jumper tray/cover removed.

As can best be seen in FIGS. 8 and 9, the jumper tray/cover 36 can also be quickly and easily removed. Once tray/cover 36 is open, the tray/cover can be removed by releasing the spring-loaded pin assemblies 48 on each end of the tray/cover. The spring-loaded pin assemblies 48 are each released by manually moving the pin 52 outward in the direction shown in FIG. 8 against the bias of the spring 54. Once the pins 52 of each assembly are clear of the holes 62 on the cover mounting brackets 64, the tray/cover 36 can be removed from the housing as shown in FIG. 9.

Figure 10:
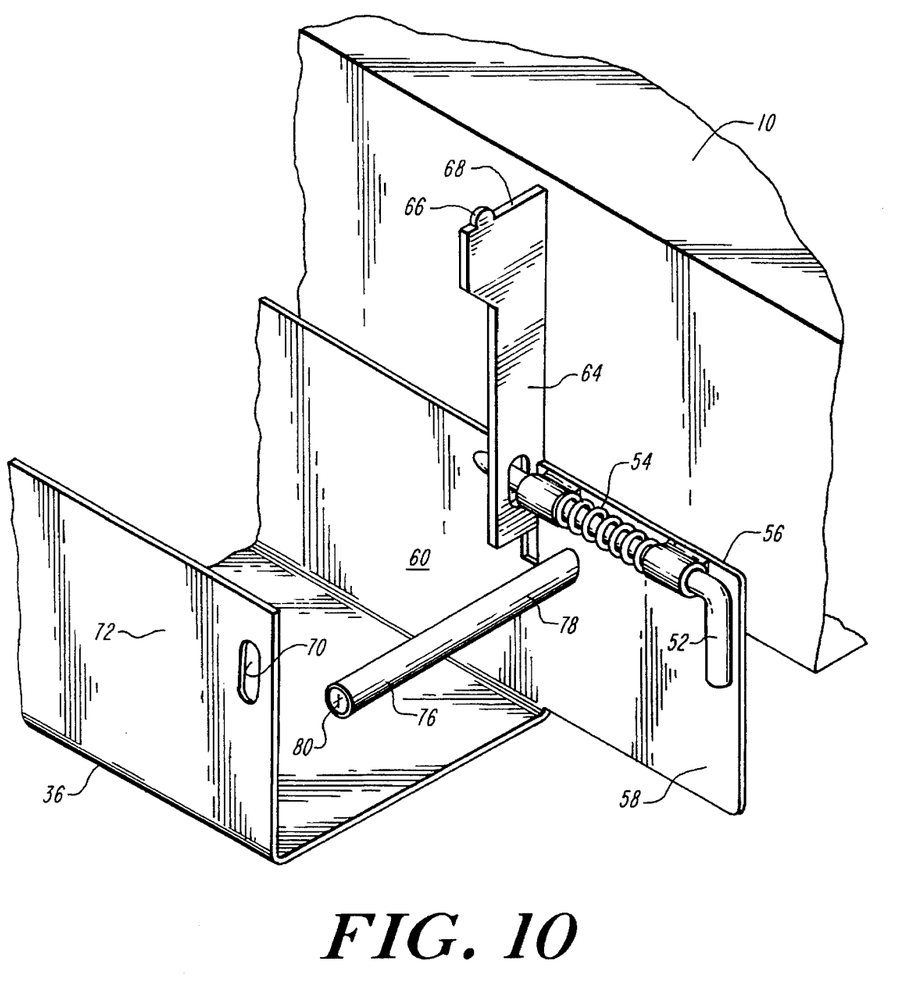
FIG. 10 is a detailed perspective view of the telephone cross-connect panel of the previous figures showing the jumper tray/cover with a jumper retainer bar.

As can be seen in FIG. 10, the tray/cover 36 can also include one or more jumper retaining bars 76 for holding the jumper cables in the tray/cover and restraining the cables during movement of the tray/cover. In the preferred embodiment, each side of the tray/cover 36 includes a retaining bar 76 comprised of a nylon sleeve 78 affixed to the lower channel side 60 of the tray/cover by screw 80.

Typically, during installation of the cross connect panel of the present invention, the array of in/out terminals 30 would be wired first. The technician would then lower jumper tray/cover 36 to wire the array of cross connect terminals 38. The jumper tray/cover of the present invention has the advantage that it permits a technician to add or modify wiring to the in/out terminal field as needed without disturbing the cross connect terminal field. This feature allows in/out terminals to be wired after cross connect terminals have been wired and eliminates the possibility that changes to the wiring of the in/out terminal field could cause existing cross connect jumpers and other wiring to the cross connect terminal field to fall out, tangle or otherwise be an impediment to servicing the in/out terminal field.

Further, the jumper tray/cover configuration of the present invention organizes and retains the cross connect jumpers and other wiring to the cross connect terminal field. Thus, when servicing of the cross connect terminal field is necessary, the existing wiring to the cross connect terminals 38 will be retained by the jumper tray/cover when it is opened and pivoted downward. Thus, during servicing, the wiring will not become entangled with wiring in the in/out terminal field.

The above description merely illustrates the presently preferred embodiments of the invention. Alternative embodiments are possible. Accordingly, the scope of the invention should be determined by the appended claims and their legal equivalents, not by the embodiments described above.

I claim:

1. A telephone cross-connect panel, comprising:
   a housing having a front and a rear, and defining an enclosure open in said front for accepting a plurality of modular jacks through said front, and for retaining said jacks in said housing;
   a cross-connect terminal array affixed on said rear of said housing, said array including a plurality of cross connect terminals which can be accessed from said rear of said housing for wiring and servicing said terminals and to which said modular jacks can be connected from inside said enclosure;
   a cover member attached to said rear of said housing and movable to a closed position over said terminal array, and to an open position which exposes said terminal array for said servicing and wiring;

a latching element for releasably retaining said cover member in said closed positions; and a tray, which includes a circuit identification directory, movably disposed in said housing and moveable from a closed position in said housing to an extended position outward of said housing, said directory being visible when said tray is in said extended position.

2. The panel of claim 1, wherein said cover member is pivotably attached by at least one pin.

3. The panel of claim 2, wherein the said pin is mounted to said cover member and is moveable to facilitate attachment of said cover member to said housing.

4. The panel of claim 3, wherein said pin includes a spring attached to said pin which biases the pin to a desired position.

5. The panel of claim 4, wherein said pin includes an extension which can be engaged for manual release of the pin.

6. The panel of claim 1, wherein said cover member includes a bottom wall, a top wall and a longitudinal wall joining said bottom and top walls;

a first retaining element on said top wall of said cover member; and a second retaining element on said housing; and wherein said first and second retaining elements are cooperative with each other when said cover member is in the closed position to maintain the cover member in the closed position.

7. The panel of claim 6, wherein said first retaining element is a portion of said top wall which defines an opening in said top wall and said second retaining element is a tab dimensioned to fit into said opening in said top wall, and wherein said tab fits into said opening when said cover member is in said closed position to maintain the cover member in the closed position.

8. The panel of claim 1, further including a plurality of cable ring mounts on said housing; and at least one cable ring mounted to the housing at one of said cable ring mounts.

9. The panel of claim 1, wherein said tray is disposed in said front of said housing below said terminal array.

\* \* \* \* \*